United States Patent [19]

Manaresi

[11] 4,029,003

[45] June 14, 1977

[54] DEVICE FOR THE EXTEMPORARY PREPARATION OF BEVERAGES

[76] Inventor: Adriana Manaresi, Via delle Porte Nuove 12, Firenze, Italy

[22] Filed: Feb. 24, 1976

[21] Appl. No.: 661,048

[52] U.S. Cl. .................................. 99/295; 99/357
[51] Int. Cl.² ........................................ A47J 31/00
[58] Field of Search .................. 99/275, 279–280, 99/283–284, 286, 289–290, 295, 297, 299, 306, 323, 357

[56] References Cited

UNITED STATES PATENTS

| | | | |
|---|---|---|---|
| 3,139,343 | 6/1964 | Baselt | 99/357 UX |
| 3,209,676 | 10/1965 | Zimmermann et al. | 99/295 X |
| 3,292,527 | 12/1966 | Stasse | 99/295 |
| 3,425,339 | 2/1969 | Fleischman et al. | 99/357 |
| 3,470,812 | 10/1969 | Levinson | 99/295 |
| 3,628,444 | 12/1971 | Mazza | 99/275 |

*Primary Examiner*—Harvey C. Hornsby
*Assistant Examiner*—Arthur O. Henderson

[57] ABSTRACT

A device for the extemporary preparation of beverages with a liquid in doses which passes through a capsule containing a charge to be solved or diluted in said liquid, after a hollow extension has been removed and a thin, covering plate of said capsule has been perforated.

The device includes: a first station for receiving the capsule and for shearing its extension, and a second beverage delivery station having a unit which is lowered to perforate the capsule and let the nozzle for the diluent or solvent liquid be inserted thereinto; a conveying collet having two diverging arms, which is angularly movable between said two stations, said collet forming with its arms in a closed position an annular seat for the capsule; and a movable shearing unit with a blade shearing the lower extension; the collet is temporarily diverged in its return stroke from the first station to the second station for abandoning the exhausted capsule.

4 Claims, 8 Drawing Figures

DEVICE FOR THE EXTEMPORARY PREPARATION OF BEVERAGES

The invention relates to a device for carrying out automatically the extemporary preparation of beverages with a liquid (water or the like) in doses, which passes through a capsule containing a charge to be solved or diluted in said liquid, after a hollow extension has been removed and a thin covering plate of said capsule has been perforated. The device has the purpose of allowing the simple preparation with capsules taken from automatic distribution machines and without the presence of appropriate staff.

According to the invention, the device substantially includes: a first station to receive the capsule and to shear the extension thereof, with a capsule arrival chute; a second beverage delivery station, with a seat for the glass or other container of the formed beverage and with a unit which is lowered to perforate the capsule and to cause the nozzle for the diluent or solvent liquid to penetrate thereinto; a conveying collet having two diverging arms which is angularly movable between said two stations, said collet forming with its arms in the closed position and annular supporting seat for the capsule and a movable shearing unit with a blade which shears the lower capsule extension and with an upper projection which before the shearing is moved into a retaining position of the capsule in the seat formed by the collet. Collet movement means and means for temporary diverging the collet in its return stroke from the second into the first station for abandoning the exhausted capsule are also provided, as well as checking means for the several operations in the desired sequences.

In a practical embodiment the two collet arms are resiliently stressed into a closed position; one of them is operated to effect the movement between a position and the other, especially from the first to the second position, against an opposing resilient action which determines the stroke in the opposite direction; a suitable stop causes the collet to diverge temporarily during the return stroke.

Each of both collet arms may have an ejecting projection which acts on the capsule to pick it from the semi-seat formed by the other arm.

The stop which causes the collet to diverge in the return stroke may be borne by a rocking member which interferes with an extension of the arm to be retained, until the other arm on reaching the first position determines the movement of the rocking member so as to neutralize the retaining effect on the first arm.

For the several controls, the device may include a shaft with radial and axial cams, one of which acts on the controlled arm of the collet, another acting on the perforation and delivery unit to lower it and then lift it up again and others acting on micro-switches. Moreover several checking means for the different operations are provided, starting with a sensor which feels the presence of the capsule in the first station.

The invention will be better understood following the description and the accompanying drawing, which illustrates an embodiment not restricting the same invention. In the drawing.

According to what is shown in the accompanying drawing, which only shows the most important parts of the device in order to understand its operation, A and B generically indicate two stations, respectively of capsule reception and delivery, between one station and the other a collet being movable and linked around a column 1. Said collet is formed by two arms 3 and 5, which with their semi-arched ends 3A and 5A respectively define, when cooperating, a seat for a capsule containing a product to be diluted or solved into a liquid dispensable by the device. The device and capsule are made by principle according to the concepts set out in the Italian Patent to STASSE No. 717,329 (Austria Pat. No. 272,559; Germany Pat. No. 1,293,977; Great Britain Pat. No. 1,051,012; U.S. Pat. No. 3,292,527) and in the Italian Pat. to MANARESI prov. No. 9605 A/73 filed on Aug. 29, 1973.

Figure 4:
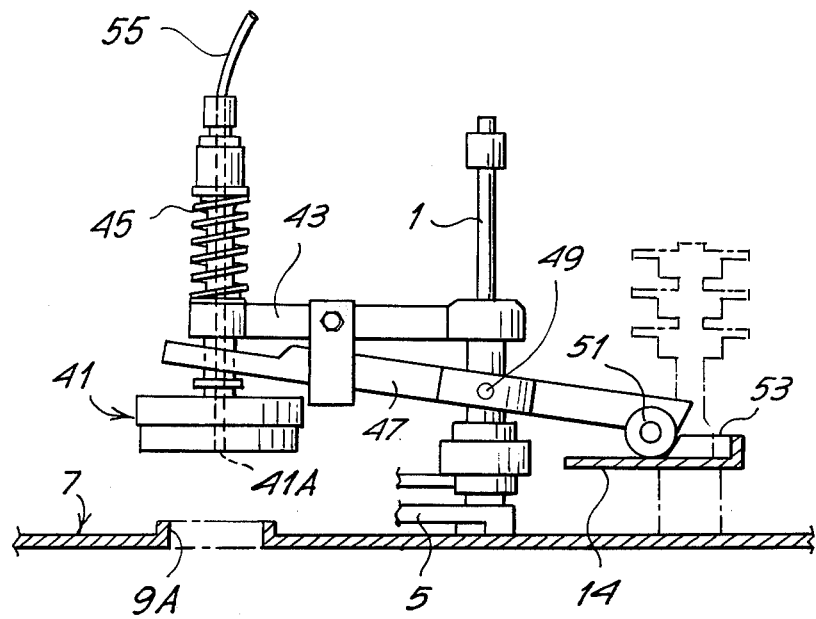
FIGS. 4, 5, 6 and 7 illustrate vertical sections along lines IV—IV; V—V, and VI—VI of FIG. 1, as well as a section along line VII—VII of FIG. 2.
Figure 4:
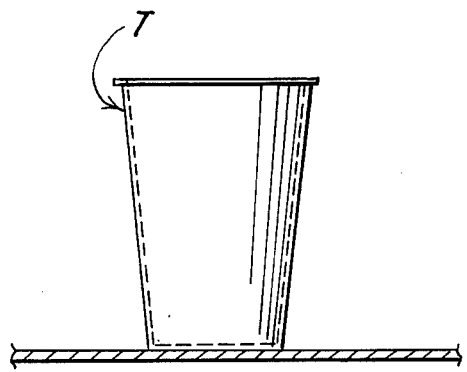
Figure 8:
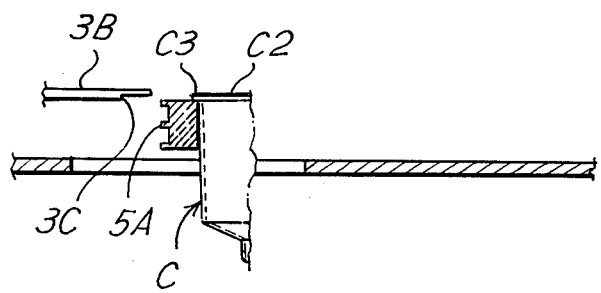
FIG. 8 shows an enlarged detail in a section along line VIII—VIII of FIG. 1.

In particular, the capsule C includes a slightly conical body whose bottom presents a removable hollow extension C1, while on the opposite side a perforable membrane C2 is provided which is fitted to an outer terminal flange C3 of the capsule C. The capsule may be accommodated in the annular seat formed by the parts 3A and 3B, on which closed parts the flange 3C lies. For delivering and preparing the beverage, the membrane C2 must be perforated and the extension C1 must be sheared and removed in such a manner that the charge of delivered liquid passes through the capsule to be collected in a beverage container, such as a cup or a glass T shown in FIG. 4; said container must be located under the base 7 of the device from which the column 1 emerges, said container T being at a level lower than the collet 3, 5 and in correspondence of the delivery station B. 9 is a draft indication of a window cut out in the base plate 7, the portion 9A (also see FIG. 4) of said window 9 extending in correspondence of the station B. The arm 3 of the collet has a small shaped arm 3B to be located over the arcuated part 5A of the other arm 5; correspondingly the arm 5 presents a small shaped arm 5B to be located over the arcuated part 3A of the other arm 3; at the bottom portion, the ends deviated by the small arms 3B, 5B, which converge towards the seat formed by the parts 3A, 5A, have picking toothed parts such as 3C shown in FIG. 8, by which a capsule may be picked from the corresponding semi-seat, said picking tooth acting on the edge of the flange 3C in the hereinafter indicated manners.

Figure 1:
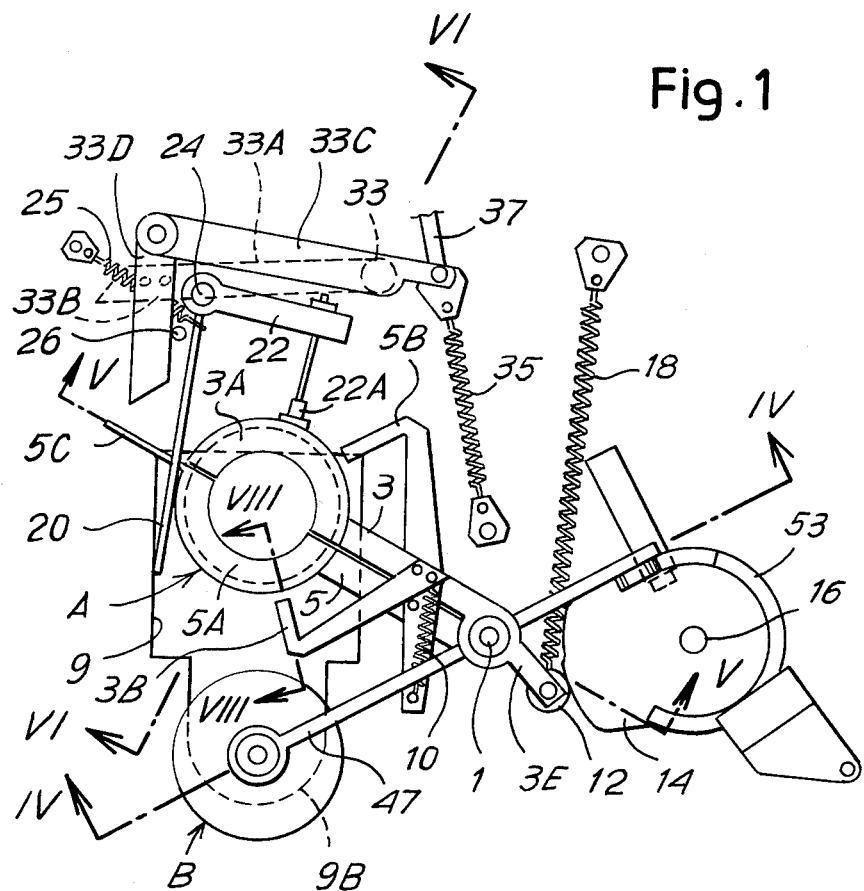
FIG. 1 is a plan view of the device when inactive and receiving a capsule.
Figure 2:
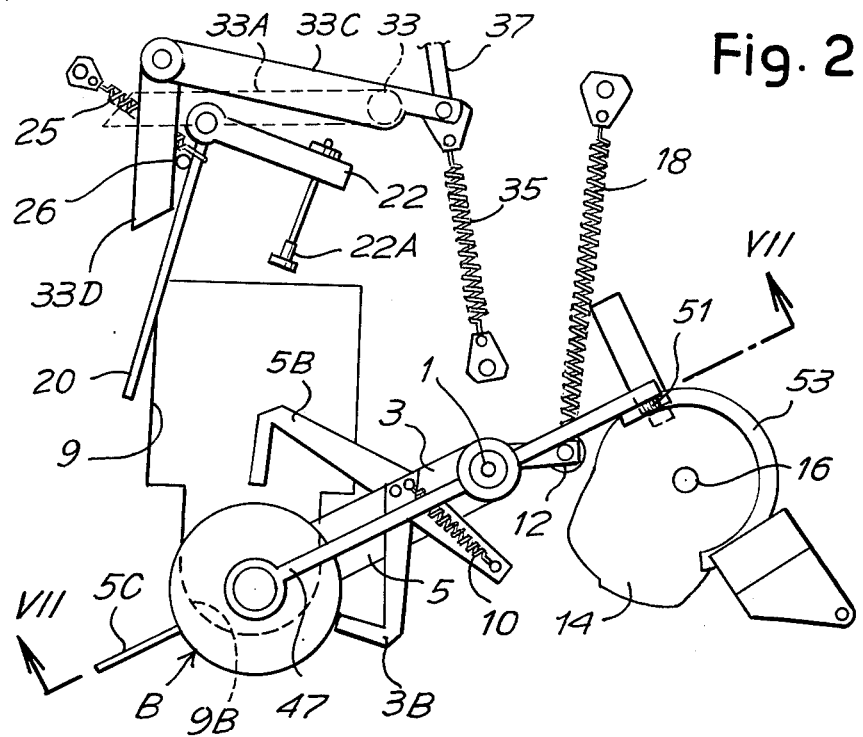
FIG. 2 is a plan view in the delivery arrangement.
Figure 3:
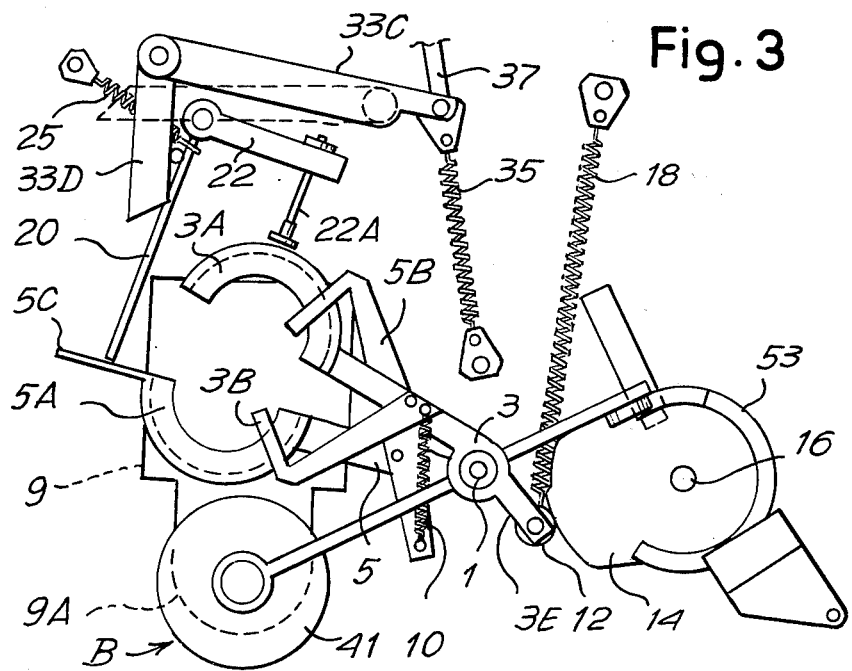
FIG. 3 is a plan view in an intermediate stage of the return stroke and in the discharge arrangement of the exhausted capsule.
Figure 7:
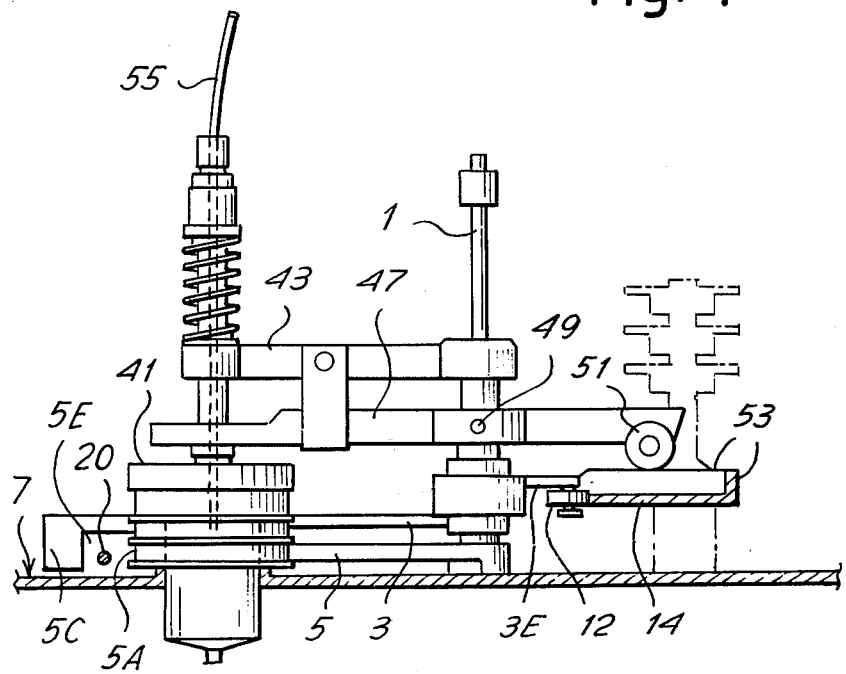

The two arms 3, 3A and 5, 5A are urged towards each other to complete the seat by a spring 10. Moreover, the arm 3 has an extension 3E which extends beyond the linkage formed by the column 1 and has a tappet roller 12 which is adapted to cooperate with a radial cam 14. Said cam is mounted to rotate with a cam shaft 16, described hereinafter in greater detail. A spring 18 secured to the base 7 and to the extension 3E stresses the arm 3 and thereby the assembly of the collet 3, 5 in the counterclockwise direction, looking at the plan views in such a manner as to urge the collet towards the delivery station B and the tappet 12 on the cam 14. The cam 14 is shaped with a projecting portion, by means of which it forces the collet into the receiving position A (arrangement in FIG. 1), while the smaller radius portion of said cam 14 allows the movement of the collet, resiliently stressed by the spring 18, to the delivery station B, where the position of the collet 3, 5 (FIG. 2) may be defined by a suitable stop not described in detail. A ramp of the cam 14 leads the arm 3 of the collet to accomplish the return stroke from the station B to the station A against the resilient action of the spring 18, while the arm 5 tends to follow the arm 3 by effect of the spring 10. During the return stroke, a stop is provided to temporarily act on the arm 5 to retain it against the effect of the resilient return by the spring 10, thereby forcing the collet to temporarily open; the neutralization of the action of this stop causes the collet to close back by effect of the spring 10 which causes the arm 5 to come close again to the arm 3. This counteractable stop is formed by a small rod 20 emerging out of a small arm 22, the whole linked in 24 onto the base 7; the assembly 22, 24 is stressed by a small spring 25 (see FIG. 2) in the counterclockwise direction looking at the plan views towards a stop 26. During the stages in which the collet 3, 5, 3A, 5A is moved from the receiving station A, the assembly 20, 22 rests onto the stop 26 by effect of the small spring 25; when, on the contrary, the collet is located in the receiving position for a capsule (station A), it acts on an adjustable extension 22A of the small arm 22 and determines a slight movement of the unit 20, 22 in the counterclockwise direction around the pivot 24, thus causing the end of the rod 20 to be brought slightly near the trajectory of the collet. The arm 5, 5A of the collet has a radial flag-shaped extension 5C (particularly see FIG. 7) with a wide recess 5E between said extension and the arm 5A. The flag-like extension 5C during the return path of the collet from the station B to the station A meets the end of the rod 20, whose position is defined by the stop 26; in this manner (see FIG. 3) the arm 5, 5A is retained by the rod 20 forming the defiladed stop, while the cam 14 forces the arm 3, 3A to prosecute the return stroke towards the station A; as the branch 3, 3A reaches the stop 22A of the small arm 22, it determines a slight movement of the unit 20, 22 in the counterclockwise direction against the action of the small spring 25 and thereby moves the end of the rod 20 from the flag-like extension 5C to the adjacent recess 5E, releasing the arm 5, 5A which is thereby brought back against the arm 3, 3A to form again the seat 3A, 5A for the capsule at the station A. Duringthis short diverging action of the collet 3, 5 the exhausted capsule is discharged, which in any case is picked out by the either semi-seat 3A, 5A (in which it might still be retained) by the action of the lower tooth of the respective small arm 5B or 3B.

At the station A, the capsule may arrive through a chute 31 which is formed to ensure that the capsule is oriented with the extension C1 forwards, in such a manner that the capsule falls into the seat formed by the two parts 3A, 5A so as to rest with the flange C3 on said annular seat. The user who is in possession of a capsule (having taken it from a dispenser after selecting the desired type) will be able to insert said capsule into an opening suitably shaped to get the capsule to slide with the aforesaid orientation.

Figure 5:
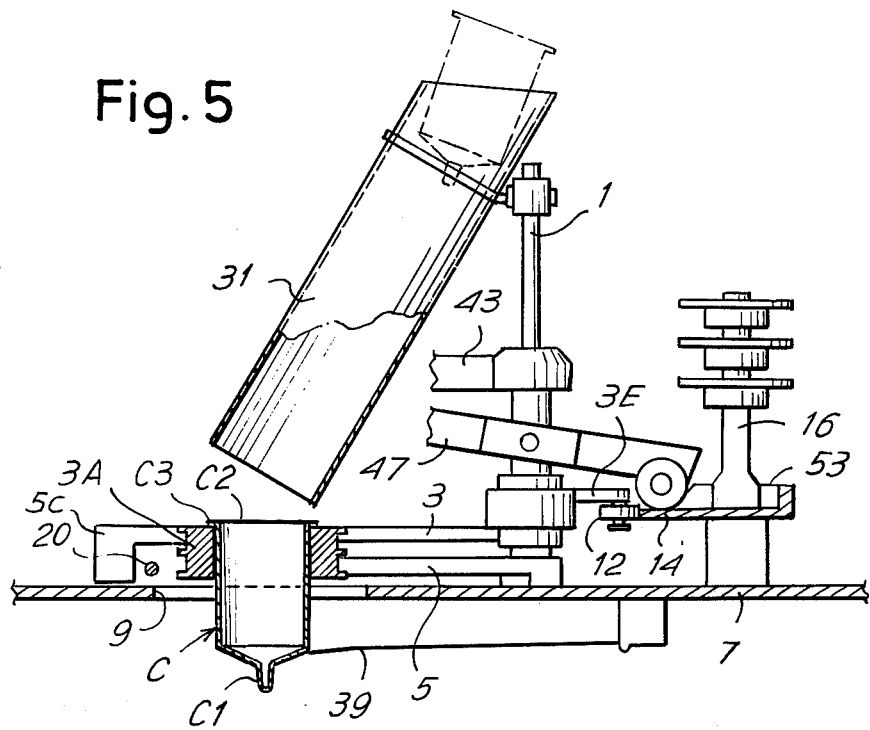
Figure 6:
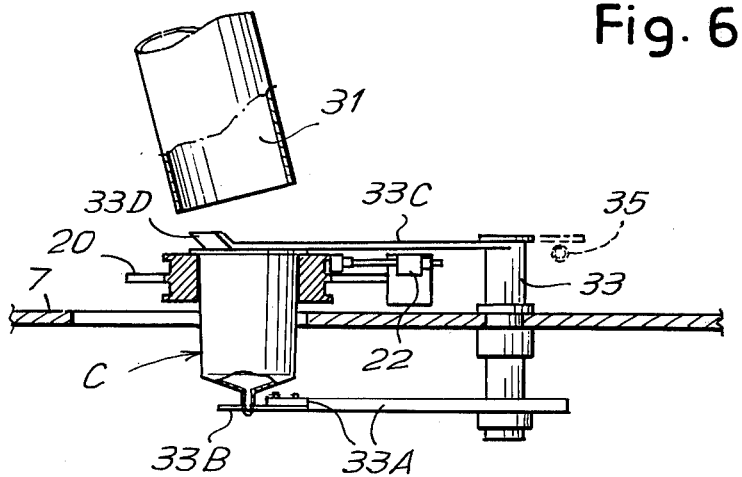

The capsule in the receiving and shearing station A must undergo the removal of the end of the extension C1. For this purpose, there is provided a unit linked in 33 onto the structure 7 and stressed into an inactive position by a small spring 35, but operatable by an electromagnet or other means through a tie rod 37 to accomplish an abrupt angular stroke in the counterclockwise direction looking at the plan views. This stroke is conditioned by appropriate checking means, among which that sensing the presence of the capsule C in the seat 3A, 5A being located in the station A; the checking means may be obtained for instance by a feeling arm 39 which operates a micro-switch (see FIG. 5). Said unit linked in 33 includes, below the base plane of the structure 7, an arm 33A bearng a blade 33B; upperly, the unit 33 has a second square arm 33C, 33D, the arm 33D being appropriately shaped and oriented, in such a manner that with the abrupt angular stroke from the arrangement shown in the drawing in the counterclockwise direction, the arm 33D arrives above the capsule accommodated in the seat 3A, 5A, in such a manner as to retain it in said seat acting on the upper surface of the flange C3 and of the plate C2; this retaining effect is anticipated with respect to the shearing action effected by the blade 33B borne by the arm 33A, which blade strikes and shears the extension C1. Immediately after the shearing, the control therefor is neutralized and the spring 35 returns all the assembly 33, 33A, 33B, 33C, 33D into the inactive position shown.

Immediately after the shearing, the capsule is conveyed into the station B by means of the collet 3, 3A, 5, 5A operated by the tappet 12 co-acting with the cam 14 which is rotated promptly by the actuation of the shaft 16; the motion of the shaft 16 is promptly operated and depending on appropriate checks. The same profile of the cam 14 imposes a dwell in the station B for the time required for the discharge of the capsule content and the preparation of the beverage which is collected in the container T, the capsule being accommodated in the recess 9B of the window 9. It is to be noted that the attainment of the station B is obtained by means of the spring 18, which yields in the presence of contrasts, if any.

At the station B for the beverage preparation, that is the capsule emptying, there is provided a unit 41 apt to be lowered and raised back being vertically guided at the end of an arm 43. For the raising there is provided a spring 45, while for the lowering there is provided a lever arm 47 linked in 49 in correspondence of the column 1 and operated by means of a roller tappet 51 by an axial cam 53, which may be combined with the radial cam 14; in this way, the lowering control of the unit 41 is positive, with the possibility of a forcing for the perforation, and is synchronized with the other movements obtained from the shaft 16. The unit 41 lowerly bears a needle 41A or other tool adapted both to perforate and tear the membrane or plate C2 of the capsule and to introduce a suitable fluid into the capsule, with an appropriate pressure; in alternative, the unit 41 may include several nozzles, designed to deliver different fluids for different functions, one of which may even be that of exerting a pressure sufficient to obtain the tearing of a lower sealing membrane of the capsule. The fluid or fluids are supplied to the unit 41 by means of one or more flexible ducts 55. The delivery may also be selective by means of appropriate optional controls. The delivery may take place by charges suitably dosed and possibly also variable and/or repeated, according to the complementary performances provided for the machine; even different liquids for the same beverage may be delivered. The beverage formed by supplying the fluid into the capsule is discharged from the sheared extension C2 to the glass or cup T or the like.

After effecting the delivery, the set program returns the collet 3, 5 to the station A from the station B with the intermediate stage (already described) of discharge of the exhausted capsule.

What I claim is:

1. A device to carry out extemporary preparation of beverages with a liquid in doses, which passes through a glass-like capsule containing a charge to be diluted with the solvent, said capsule having an upper opening, a removable lower hollow extension and a thin covering plate for said opening, the device comprising: a first station to receive said capsule and to shear said extension thereof, including a capsule arrival chute; a second, beverage delivery station, including a seat for a beverage container and a unit which can be lowered to perforate at least one portion of said capsule and to cause a nozzle for the solvent to penetrate thereinto; a conveying collet having two diverging arms, angularly movable between said first and said second stations, and forming with said arms in a closed position an annular supporting seat for said capsule; a removable shearing unit including a blade to shear said capsule extension and an upper projection which can be removed into a retaining position of said capsule in said seat; collet movement means between said first and said second stations; means for temporarily diverging said collet in its return stroke from said second into said first station, for abandoning said capsule when exhausted; and means for checking the several operations in a desired sequence; further comprising an ejecting projection on each of said collet arms, with a tooth facing its own arm and acting on an edge of said capsule to pick it out from a semi-seat formed by the other arm.

2. The device as defined in claim 1, further comprising a cam shaft with radial and axial cams, one of which acts on said operated arm of the collet, another of which acts on said perforating unit of the second station to lower it and then raise it back, and others of said cams act on checking micro-switches.

3. The device as defined in claim 1, further comprising a sensor to feel the presence of said capsule in said first station for starting an operational cycle.

4. A device to carry out extemporary preparation of beverages with a liquid in doses, which passes through a glass-like capsule containing a charge to be diluted with the solvent, said capsule having an upper opening, a removable lower hollow extension and a thin covering plate for said opening, the device comprising: a first station to receive said capsule and to shear said extension thereof, including a capsule arrival chute; a second, beverage delivery station, including a seat for a beverage container and a unit which can be lowered to perforate at least one portion of said capsule and to cause a nozzle for the solvent to penetrate thereinto; a conveying collet having two diverging arms, angularly movable between said first and said second stations, and forming with said arms in a closed position an annular supporting seat for said capsule; a removable shearing unit including a blade to shear said capsule extension and an upper projection which can be moved into a retaining position of said capsule in said seat; collet movement means between said first and said second stations; means for temporarily diverging said collet in its return stroke from said second into said first station, for abandoning said capsule when exhausted; and means for checking the several operations in a desired sequence; spring-biased means engaged between said collet arms to stress them resiliently into the closed position; cam means acting on one of said arms to move one of said collet arms from said first to said second station, against an opposing resilient action; stop means causing the temporary diverging of said collet during the return stroke; wherein said stop means is borne by a rocking member, an extension being provided on one of said collet arms to interfere with said stop means and retain said one arm; said other arm being adapted, when reaching said first station, to determine the movement of said rocking member until it neutralizes the retaining effect by said stop means on said first arm.

* * * * *